Sept. 20, 1932.  G. WILCOX  1,878,356
AUTOMATIC OIL STOP
Filed Oct. 23, 1929
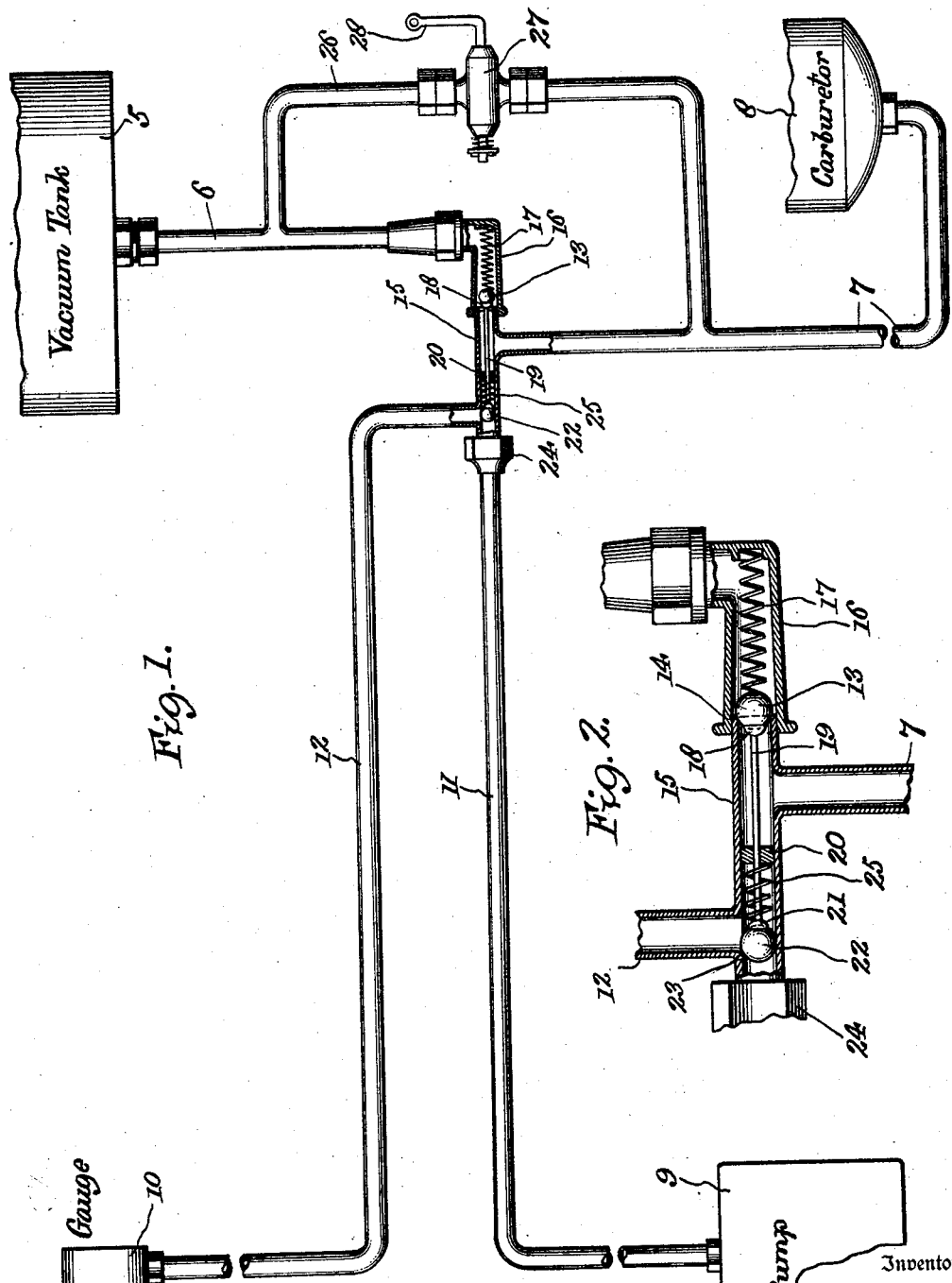

Patented Sept. 20, 1932

1,878,356

UNITED STATES PATENT OFFICE

GERTRUDE WILCOX, OF MAYVILLE, NEW YORK

AUTOMATIC OIL STOP

Application filed October 23, 1929. Serial No. 401,948.

The present invention relates to improvements in automatic oil stop, and more particularly relates to a device whereby the drop in pressure in the oil system of an internal combustion engine, due to deficiency of oil in the crank case, will automatically act to close a valve in the fuel supply line, whereby fuel will be cut off from the carburetor and from the engine, resulting in a stoppage of the motor.

An object of the invention is to prevent damage to the bearings and to the parts of engines through lack of oil.

Another object of the invention is to provide a device for accomplishing the purpose above described, in which a compact operating unit is provided in the fuel and the oil lines of such a construction as to admit of its placing in the existing systems without entailing great modification.

The invention also contemplates a by-pass whereby fuel may be supplied to the carburetor to gain the nearest garage, where the oil may be replenished.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a diagrammatic view with parts shown in section and parts broken away of a fuel and oil system embodying the invention, and Figure 2 is an enlarged fragmentary view partly in elevation and partly in section, showing the control unit.

Referring more particularly to the drawing, 5 represents a vacuum tank or other source of gasoline or fuel supply, from which the gasoline is adapted to flow through the pipe connections 6 and 7 to the carburetor 8.

The oil pump is shown at 9 and the oil gauge at 10, these parts being connected by the usual oil line composed of pipes 11 and 12.

In accordance with the invention, the oil and fuel lines are brought close together, and the descent of the gasoline from the vacuum tank 5 to the carburetor 8 is under the control of a valve 13, which is controlled by the pressure or deficiency of pressure in the oil line 11, 12.

The valve 13, which is in the embodiment of the invention shown in the drawing illustrated as a ball valve, is mounted to reciprocate toward and from a seat 14 provided on the T-head 15 of the pipe 7. Of course, this head or sleeve 15 might be made separately or in one piece with the pipe 7, and the seat 14 may be upon any part desired. The ball valve 13 is smaller in diameter than the internal diameter of the portion of the elbow 16 in which it reciprocates, and it is urged to the seat 14 by a coil spring 17. The ball valve 13 is adapted to be engaged by a cup head or a head 18 of any other form, carried by and movable with a plunger rod 19, which slides freely through a partition 20 useful for maintaining the fuel and the oil separated. A cup or other head 21 is mounted upon the opposite end of the plunger rod 19, for engaging against a ball or the like 22 adapted to close against a seat 23 in the sleeve 15 adjacent the coupling 24 of the sleeve with the oil pipe 11. The sleeve 15 connects with the companion oil pipe 12 at the opposite side of the seat 23. The coil spring 25 is wound about the plunger rod 19 having one end abutting against the partition 20, and the other end against the head 21. The cup heads will fit the spherical balls 13 and 22.

A by-pass 26 connects with the pipes 6 and 7, and cuts out the control unit. The by-pass is provided with a valve 27 having an operating arm 28 which is controllable preferably from the driver's compartment of the automobile.

In the use of the device, with oil up to a proper level in the crank case of the internal combustion engine, and the motor in operation, the pump 9 will supply a forced circulation of oil through the pipes 11 and 12, and to the gauge and also to all of the bearings. With a full supply of oil, the pressure will be sufficient to shift the ball 22 away from its seat 23, whereby the body of oil may pass from the pipe 11 to the pipe 12, and into the system. Consequently, when the oil pressure is normal, the valve 13 will be moved away from its seat 14 in opposition to the combined action of the coil springs 17 and 25, which tend to seat the valve 13. When the valve 13 is held open, the gasoline from the vacuum tank may flow down through the pipes 6 and 7 and supply the carburetor 8. Thus the motor will continue to run as long as the oil pressure is maintained. However, so soon as this oil pressure falls below a predetermined degree, as when there is a deficiency of oil in the motor crank case, the resistance of the springs 17 and 25 will fail to be overcome, and the valve 13 will become seated upon the seat 14, thus cutting off the supply of gasoline to the carburetor 8; it being understood that the by-pass valve 27 is normally closed, and is only opened when the motor has been automatically stopped through lack of oil for the purpose of allowing the vehicle to get to the nearest service station, where the oil supply may be replenished. Thereupon, the valve 27 should be again closed to cause the automatic operation of the control unit.

It will be obvious that many changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. In a device of the kind described, a fuel line, an oil pressure line, a sleeve extending in common to said lines, a spring pressed ball valve to engage one end of the sleeve for closing the fuel supply, a second spring pressed ball valve to seat in the opposite end of the sleeve for closing the oil supply at the same time, the last mentioned valve being acted upon by the normal oil pressure to move the same away from its seat, and a connection between the valves whereby the said movement of the oil pressure valve forces the opening of the fuel supply valve to allow the free passage of fuel through the fuel line.

2. In a device of the kind described, a fuel line, an oil pressure line, a sleeve extending in common to said lines, a fuel valve for closing within one portion of said sleeve to control the flow of fuel through the fuel line, spring means engaging said valve to normally urge the same to a closed position, an oil valve in the oil line adapted to close against a remote portion of the sleeve to control the flow of oil and openable in the direction of fuel pressure, a rigid rod extending between said valves and rigidly coupled to each valve, a partition in said tube separating said fuel and oil lines, and forming a bearing through which said rod horizontally slides, and a second spring backed by said partition and engaging the oil valve to urge the same to a closed position in opposition to the action of the pumped oil pressure.

GERTRUDE WILCOX.